(12) United States Patent
Kachi et al.

(10) Patent No.: US 11,154,943 B2
(45) Date of Patent: Oct. 26, 2021

(54) CHAINSAW

(71) Applicant: MAKITA CORPORATION, Aichi (JP)

(72) Inventors: Hideki Kachi, Aichi (JP); Koji Haneda, Aichi (JP); Masaki Sakuragi, Aichi (JP)

(73) Assignee: MAKITA CORPORATION, Aichi (JP)

( * ) Notice: Subject to any disclaimer, the term of this patent is extended or adjusted under 35 U.S.C. 154(b) by 18 days.

(21) Appl. No.: 15/450,091

(22) Filed: Mar. 6, 2017

(65) Prior Publication Data
US 2017/0259359 A1 Sep. 14, 2017

(30) Foreign Application Priority Data
Mar. 10, 2016 (JP) .............................. JP2016-047429

(51) Int. Cl.
*B23D 57/02* (2006.01)
*B27B 17/00* (2006.01)

(52) U.S. Cl.
CPC ........ *B23D 57/023* (2013.01); *B27B 17/0033* (2013.01)

(58) Field of Classification Search
CPC .... A01G 3/086; B26B 21/405; B27B 17/0008
See application file for complete search history.

(56) References Cited

U.S. PATENT DOCUMENTS 2,765,822 A * 10/1956 Smith ................. B27B 17/0091
30/379
4,138,812 A * 2/1979 Zimmerer ............... F16F 15/08
30/381
(Continued)

FOREIGN PATENT DOCUMENTS

CN 101301749 A 11/2008
CN 102428838 A 5/2012
(Continued)

OTHER PUBLICATIONS

Translation of Communication dated Dec. 26, 2019, from The State Intellectual Property Office of the P.R. of China in Application No. 201710070968.5.
(Continued)

*Primary Examiner* — Ghassem Alie
*Assistant Examiner* — Fernando A Ayala
(74) *Attorney, Agent, or Firm* — Sughrue Mion, PLLC

(57) ABSTRACT

Disclosed is a chainsaw capable of making it less likely that vibrations due to driving of an electric motor and a endless movement of a saw chain are transmitted to a worker, thereby enabling the worker to become less likely to be fatigued even in work using the chainsaw. The chainsaw includes an electric motor provided inside a body casing; a guide bar provided in a front portion of the body casing in such a manner as to protrude forwardly; a saw chain provided around an outer periphery of the guide bar in an endlessly movable manner, and configured to be endlessly moved along the outer periphery of the guide bar under driving of the electric motor; a handle section provided with respect to the body casing, and configured to be gripped by a worker; and an anti-vibration member interposed between the body casing and the handle section.

4 Claims, 2 Drawing Sheets

(56) References Cited

U.S. PATENT DOCUMENTS

| | | | | |
|---|---|---|---|---|
| 4,407,068 A * | 10/1983 | Wilson | ............ | B26B 19/44 |
| | | | | 30/133 |
| 4,727,828 A * | 3/1988 | Ueno | ............ | F01N 1/08 |
| | | | | 123/185.3 |
| 5,018,492 A * | 5/1991 | Wolf | ............ | B27B 17/00 |
| | | | | 123/198 E |
| 2008/0276469 A1* | 11/2008 | Guip | ............ | B27B 17/0033 |
| | | | | 30/383 |
| 2012/0073144 A1* | 3/2012 | Tamura | ............ | A01G 3/053 |
| | | | | 30/272.1 |
| 2014/0047722 A1 | 2/2014 | Onose et al. | | |
| 2015/0151447 A1* | 6/2015 | Petersson | ............ | B25F 5/006 |
| | | | | 30/381 |

FOREIGN PATENT DOCUMENTS

| | | |
|---|---|---|
| CN | 203566795 U | 4/2014 |
| CN | 104582886 A | 4/2015 |
| JP | 2015-44293 A | 3/2015 |
| WO | 2013187837 A2 | 12/2013 |

OTHER PUBLICATIONS

Translation of Communication dated Aug. 18, 2020, from The State Intellectual Property Office of the P.R. of China in Application No. 201710070968.5.

Translation of Communication dated Feb. 5, 2021, from The State Intellectual Property Office of the P.R. of China in Application No. 201710070968.5.

* cited by examiner

CHAINSAW

BACKGROUND

1. Field

The present invention relates to a chainsaw for cutting wood such as timber or lumber by a saw chain which is endlessly moved along an outer periphery of a guide bar under driving of an electric motor.

2. Description of the Related Art

JP 2015-044293A discloses a chainsaw for cutting wood such as timber or lumber. This chainsaw comprises a body casing, an electric motor housed in the body casing, a guide bar provided on a front region of a lateral wall of the body casing, and a saw chain wound around an outer periphery of the guide bar. Further, a rear handle is formed integrally with a rear portion of the body casing, and a front handle is fixed to a front portion of the body casing, wherein each of the rear and front handles has a grip to be gripped by a user or worker. In the above chainsaw, when a worker grips the rear handle and the front handle, for example, by his/her right hand and left hand, respectively, and manipulates an operating lever provided in the rear handle, by the right hand, the electric motor is driven, and thus the saw chain is endlessly moved along the outer periphery of the guide bar. Then, the worker can press, against wood such as timber or lumber, the saw chain being endlessly moved along the outer periphery of the guide bar, to cut the wood by the saw chain.

SUMMARY

The chainsaw disclosed in JP 2015-044293A is a type of chainsaw employing an electric motor as a driving source. Thus, as compared to another type employing an engine such as internal combustion engine, as a driving source, it is possible to reduce vibration which would be generated from the driving source, to some degree. However, even in the type of chainsaw employing an electric motor as a driving source, there has been a problem that slight vibration occurring due to driving of the electric motor and vibration occurring when a saw chain is endlessly moved along an outer periphery of a guide bar are transmitted from a body casing to rear and front handles, causing early fatigue of a worker. An aspect of the present invention addresses a technical problem of making it less likely that vibrations due to driving of an electric motor and a endless movement of a saw chain are transmitted to a worker, thereby enabling the worker to become less likely to be fatigued even in work using a chainsaw.

In order to solve the above technical problem, an aspect of the present invention provides a chainsaw which comprises: an electric motor provided inside a body casing; a guide bar provided in a front portion of the body casing in such a manner as to protrude forwardly; a saw chain provided around an outer periphery of the guide bar in an endlessly movable manner, and configured to be endlessly moved along the outer periphery of the guide bar under driving of the electric motor; a handle section provided with respect to the body casing, and configured to be gripped by a worker; and an anti-vibration member interposed between the body casing and the handle section.

In the chainsaw of the present invention having the above feature, the anti-vibration member makes it less likely that vibration occurring due to driving of the electric motor and vibration occurring when the saw chain is endlessly moved along the outer periphery of the guide bar are transmitted to the handle section, so that a worker becomes less likely to be fatigued with the vibrations due to the driving of the electric motor and the endless movement of the saw chain.

Preferably, the chainsaw of the present invention further comprises a battery pack for feeding electric power to the electric motor, wherein the battery pack is detachably provided on the body casing. According to this feature, the battery pack as a heavy load is attached to the body casing as a vibration source, to thereby suppress the vibrations. Thus, the worker becomes much less likely to be influenced by and fatigued with the vibrations.

Preferably, in the chainsaw of the present invention, a plurality of the anti-vibration members are provided between the body casing and the handle section to surround a position of the center of gravity of the chainsaw. According to this feature, in a situation where the worker grips the handle section, the body casing is less likely to incline with respect to the handle section gripped by the worker, so that it becomes possible to prevent inclination of the saw chain around the outer periphery of the guide bar. More preferably, in the above chainsaw, the handle section is provided with a manipulation unit operable to output an operating signal for operating the electric motor; and the body casing is provided with a control unit connected to a signal line for transmitting therethrough the operating signal output from the manipulation unit, wherein the control unit is operable to control the driving of the electric motor based on the operating signal, and wherein a connection point between the control unit and the signal line is disposed inside the body casing at a position falling within a region surrounded by the plurality of anti-vibration members. According to this feature, the connection point between the control unit and the signal line is disposed at a position falling within the region surrounded by the plurality of anti-vibration members. Thus, a displacement due to the vibrations is suppressed, and thereby breaking of the connection point between the control unit and the signal line is less likely to occur. More preferably, in the above chainsaw, at least one of the plurality of anti-vibration members is comprised using a coil spring or a tubular-shaped, flexible, elastic member, defining therein a through-hole extending in an axial direction thereof, wherein the signal line is led out from the handle section into the body casing via the through-hole of the at least one anti-vibration member. According to this feature, the at least one anti-vibration member allows the signal line to be prevented from being exposed to outside, so that breaking of the signal line is less likely to occur. More preferably, in the above chainsaw, the signal line connects the manipulation unit and the control unit together with a slack in a region between the body casing and the handle section. According this feature, the slack of the signal line makes it possible to reliably suppress breaking of the signal line, even in a situation where, due to vibration of the body casing during use of the chainsaw, the body casing is displaced with respect to the handle section.

Preferably, in the chainsaw of the present invention, the handle section is composed of a handle unit integrally having a first handle and a second handle which are configured to be gripped, respectively, by one of worker's hands and the other hand, wherein the anti-vibration member is interposed between the body casing and the handle unit. According to this feature, the first and second handles can be attached to the body casing in the form of a single unit. This makes it possible to improve assembling efficiency of the chainsaw.

DESCRIPTION OF EXEMPLARY EMBODIMENTS

Figure 1:
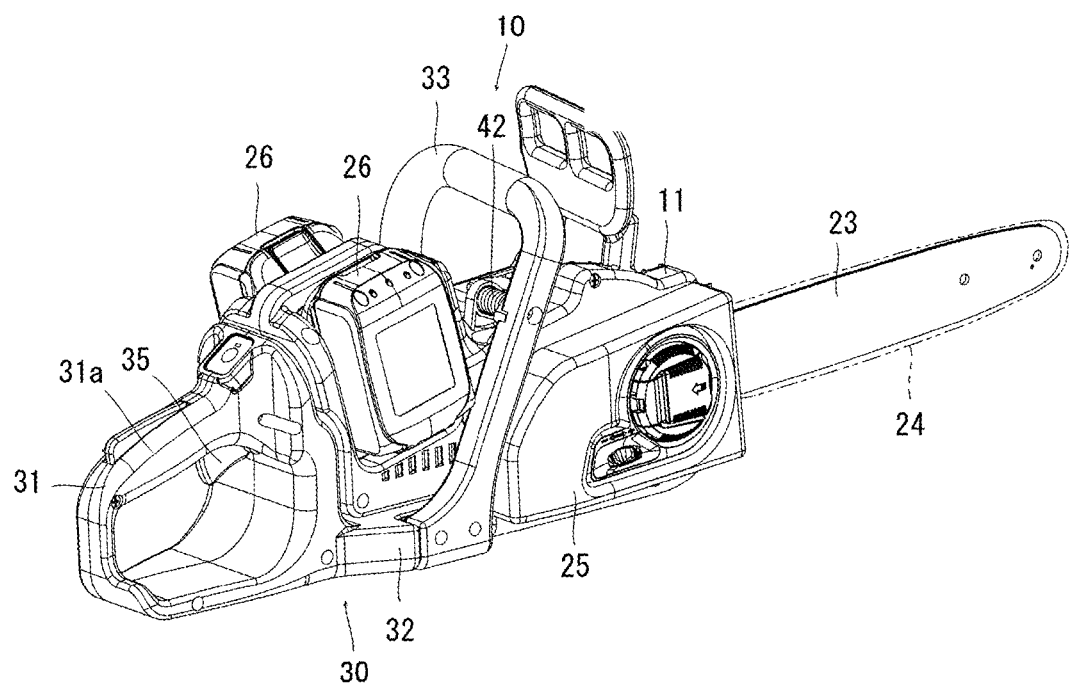
FIG. 1 is a perspective view of a chainsaw according to one embodiment of the present invention.
Figure 2:
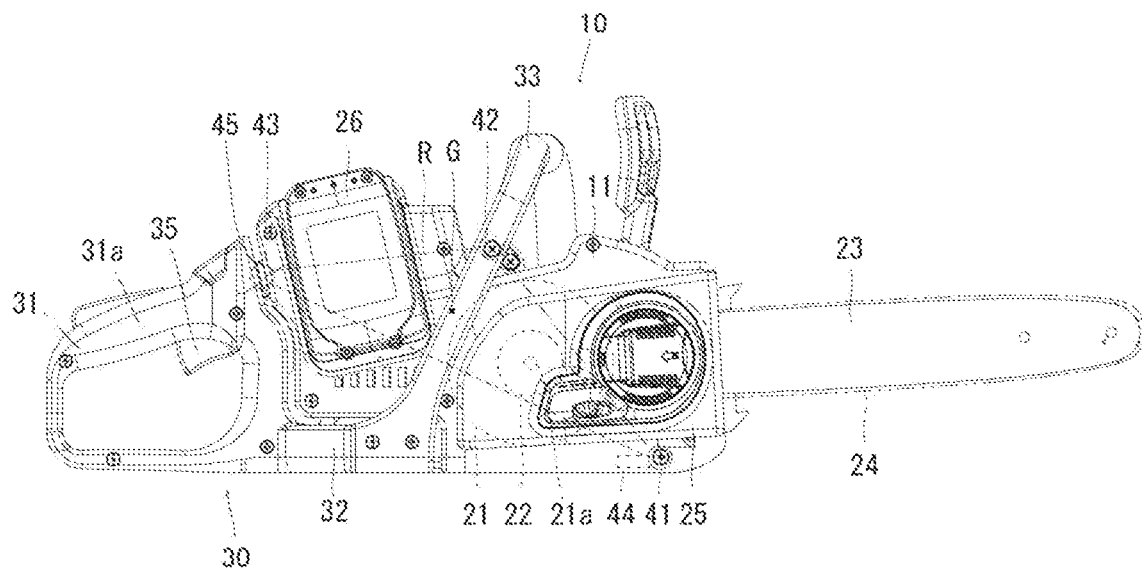
FIG. 2 is a side view of the chainsaw in FIG. 1.

With reference to the drawings, a chainsaw of the present invention will now be described based on one exemplary embodiment thereof. As depicted in FIGS. 1 and 2, a chainsaw 10 according to this embodiment comprises a body casing 11 which houses an electric motor 21 and others, and a handle section 30 attached to a rear portion of the body casing 11. The electric motor 21 is provided inside the body casing 11 at a position forward of an intermediate portion of the body casing 11 in a forward/rearward direction. The electric motor 21 comprises a rotary shaft 21a which is rotatable along with driving of the electric motor 21 and is disposed to protrude outwardly from an intermediate region of a right lateral wall of the body casing 11. A sprocket 22 is fixed to the rotary shaft 21a of the electric motor 21. That is, the sprocket 22 is configured to be rotated under driving of the electric motor 21. A guide bar 23 is fixed to a front region of the right lateral wall of the body casing 11 at a position forward of the sprocket 22, in such a manner as to protrude forwardly, and a saw chain 24 is provided in a tensioned state between the sprocket 22 and an outer periphery of the guide bar 23 in an endlessly movable manner. A sprocket cover 25 is provided on the front region of the right lateral wall of the body casing 11, to cover the rotary shaft 21a of the electric motor 21, the sprocket 22, and a base end of the guide bar 23.

Figure 3:
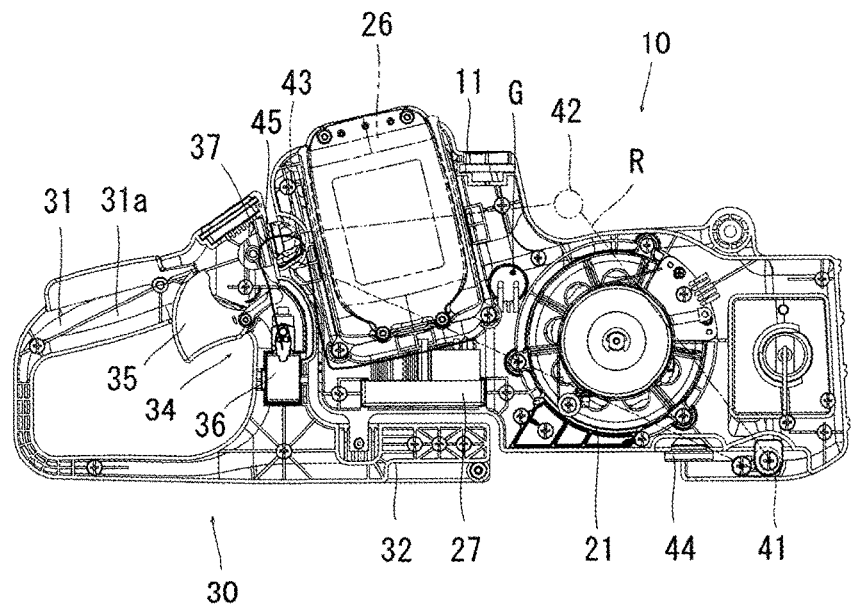
FIG. 3 is a side view of the chainsaw in FIG. 1, wherein respective right halves of a body casing and a handle section are removed to bring insides thereof into view.
Figure 4:
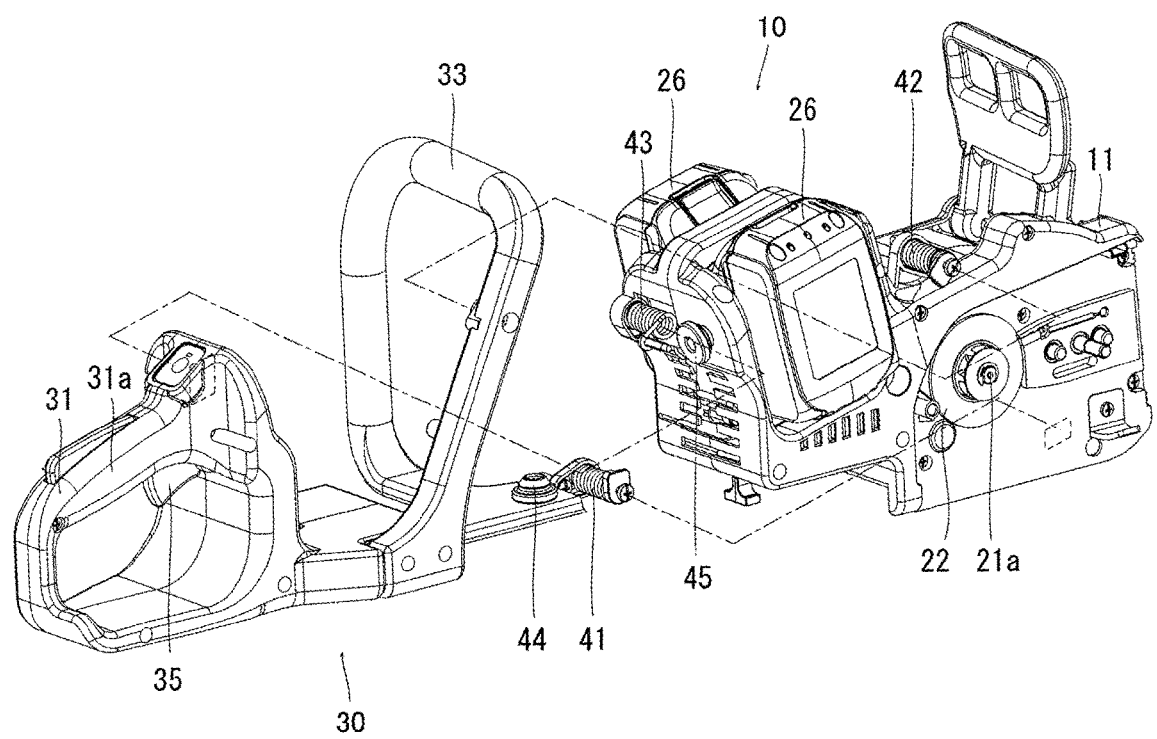
FIG. 4 is a perspective view of the chainsaw in FIG. 1, wherein the body casing and a handle unit are disassembled from each other.

As depicted in FIGS. 1 to 2, a battery pack 26 is detachably provided on the rear portion of the body casing 11. In this embodiment, a pair of right and left battery packs 26 are provided, respectively, on right and left opposite sides of the rear portion of the body casing 11. The battery packs 26 are operable to feed electric power to the electric motor 21 to thereby drive the electric motor 21. As depicted in FIG. 3, a control unit 27 is provided inside the body casing 11 at a lower rearward side of the body casing 11. The control unit 27 is operable to control driving of the electric motor 21.

As depicted in FIGS. 1 and 2, the handle section 30 is configured to be gripped by a worker during use of the chainsaw 10, and attached to the rear portion of the body casing 11 in an anti-vibration manner. In this embodiment, the handle section 30 is composed of a handle unit integrally having a rear handle (first handle) 31 provided on the rear portion of the body casing 11, and a front handle (second handle) 33 provided frontward of the intermediate portion of the body casing 11. The rear handle 31 has an approximately annular shape in side view, and an upper portion of the rear handle 31 is formed as a grip portion 31a configured to be gripped by a worker. Further, a lower portion of the rear handle 31 is integrally formed with a base portion 32 extending forwardly. The front handle 33 is formed in an upside-down approximately-U shape and fixed to the base portion 32.

As depicted in FIG. 3, the rear handle 31 is provided with a manipulation unit 34 which comprises a trigger lever 35 swingably supported by the grip portion 31a, and an operating switch 36 operable to output an operating signal in response to a swinging manipulation of the trigger lever 35.

The operating switch 36 is connected to the control unit 27 via a signal line 37, and thus the operating signal output from the operating switch 36 is transmitted to the control unit 27 through the signal line 37. Specifically, one end of the signal line 37 is connected to the operating switch 36, and, after arranging the signal line 37 to extend from an inside of the handle section 30 to an inside of the body casing 11, the other end of the signal line 37 is connected to the control unit 27. The signal line 37 is connected to the manipulation unit 36 and the control unit 27 with a lengthwise slack therebetween.

A plurality of (in this embodiment, five) anti-vibration members 41 to 45 are interposed between the body casing 11 and the handle section 30, to suppress the occurrence of the situation where vibrations generated in the body casing 11 due to the driving of the electric motor 21 and the endless movement of the saw chain 24 are transmitted to the handle section 30. Each of the anti-vibration members 41 to 43 is comprised using a coil spring, and the anti-vibration member 41, the anti-vibration member 42 and the anti-vibration member 43 are provided, respectively, between a lower region of a front portion of the body casing 11 and a lower end of the front handle 33, between an upper region of the forward/rearward-directional intermediate portion of the body casing 11 and an upper region of a right portion of the front handle 33, and between an upper region of the rear portion of the body casing 11 and an upper region of the front portion of the rear handle 31. Each of the anti-vibration members 41 to 43 comprised of a coil spring. Each of the coil springs 41 to 43 is formed by spirally winding a wire, and each coil sprig 41 to 43 is installed such that a spirally-winding direction (axial direction) thereof is oriented in a rightward/leftward direction. Thus, each of the anti-vibration members 41 to 43 can be extended and contracted in the rightward/leftward direction to absorb rightward/leftward directional vibration of the body casing 11, and can be bent in an upward/downward direction and in the forward/rearward direction to absorb upward/downward directional and forward/rearward directional vibrations of the body casing 11. The anti-vibration member 43 comprised of a coil spring defines therein a through-hole extending in the axial direction thereof. The aforementioned signal line 37 is connected to the operating switch 36 in the handle section 30 and the control unit 27 in the body casing 11, via the through-hole of the anti-vibration member 43.

Each of the anti-vibration members 44, 45 is comprised of an elastic rubber member, and the anti-vibration member 44 and the anti-vibration member 45 are provided, respectively, between the lower region of the front portion of the body casing 11 and the lower end of the front handle 33, and between the upper region of the rear portion of the body casing 11 and the upper region of the front portion of the rear handle 31.

When the chainsaw 10 constructed as above is used in wood cutting work, a worker grips the front handle 33 and the grip portion 31a of the rear handle 31, for example, by his/her left hand and right hand, respectively, and pulls the forefinger of the right hand toward the grip portion 31a to swingingly move the trigger lever 35. In response to the manipulation of the trigger lever 35, the operating switch 36 outputs an operating signal to the control unit 27, and thus the electric motor 21 is driven based on control of the control unit 27. The saw chain 24 is endlessly moved along the outer periphery of the guide bar 23 by the sprocket 22 being rotated under driving of the electric motor 21. Then, the worker manipulates the handles 31, 33 to press, against an outer periphery of lumber such as a log, the saw chain 24 being endlessly moved along the outer periphery of the guide bar 23, to thereby cut the lumber such as a log.

In the chainsaw according to this embodiment, the electric motor 21 is employed as a driving source, so that it becomes possible to reducing vibration to some degree, as compared to a chainsaw employing an engine such as internal combustion engine as the driving source. However, even in the above chainsaw employing the electric motor 21 as a driving source, there has been a risk that vibration due to driving of the electric motor 21 and vibration due to the saw chain 24 being endlessly moved along the outer periphery of the guide bar 23 are transmitted to the handles 31, 33, causing early fatigue of a worker who grips the handles 31, 33. In the chainsaw 10 according to this embodiment, the anti-vibration members 41 to 45 are interposed between the body casing 11 and the handle section 30. This makes it less likely that vibrations occurring in the body casing 11 due to driving of the electric motor 21 and the saw chain 24 being endlessly moved along the outer periphery of the guide bar 23 are transmitted to the handle section 30, so that a worker becomes less likely to be fatigued with the vibrations due to the driving of the electric motor 21 and the endless movement of the saw chain 24.

In the chainsaw 10 according to this embodiment, the battery pack 26 for feeding electric power to the electric motor 21 is detachably provided on the body casing 11. In this case, the battery pack 26 as a heavy load is attached to the body casing 11 as a vibration source, to thereby suppress the vibrations. Thus, the worker is much less likely to be influenced by and fatigued with the vibrations. It should be understood that, instead of the battery pack 26, electric power may be fed from an external power source to the electric motor 21 via a power cord. In this case, although it becomes impossible to obtain an effect of suppressing vibrations based on a weight of the battery pack 26, the remaining effects can also be obtained.

When the anti-vibration members 41 to 45 are interposed between the body casing 11 and the handle section 30 to suppress vibration transmission to the handle section 30, as in the case of this embodiment, a new problem can arise that the handle section 30 becomes unstable and wobbles with respect to the body casing 11. Therefore, in the chainsaw 10 according to this embodiment, the anti-vibration members 41 to 45 are provided between the body casing 11 and the handle section 30 to surround a position G of the center of gravity of the chainsaw 10, as depicted in FIGS. 2 and 3. In this case, the handle section 30 gripped by the worker becomes stable without wobbling with respect to the body casing 11, so that it becomes possible to prevent inclination and wobbling of the saw chain 24 around the outer periphery of the guide bar 23.

Moreover, when the body casing 11 and the handle section 30 are prepared as separate components, and the anti-vibration members 41 to 45 are interposed between the body casing 11 and the handle section 30 to suppress vibration transmission to the handle section 30, another new problem can arise that the signal line 37 composed of an electric cord connecting between the manipulation unit 34 of the handle section 30 and the control unit 27 in the body casing 11 is broken due to discrete displacements of the body casing 11 and the handle section 30. Therefore, in the chainsaw 10 according to this embodiment, a connection point between the control unit 27 and the signal line 37 is disposed inside the body casing 11 at a position falling within a region R surrounded by the anti-vibration members 41 to 45, as depicted in FIG. 3. In this case, the connection point between the control unit 27 and the signal line 37 is disposed at a position falling within the region R surrounded by the anti-vibration members 41 to 45. Thus, a displacement due to the vibrations is suppressed, and thereby breaking of the connection point between the control unit 27 and the signal line 37 is less likely to occur.

In the chainsaw 10 according to this embodiment, the anti-vibration member 43 is comprised of a coil spring defining therein a through-hole extending in the axial direction thereof, and the signal line 37 is led out from the handle section 30 into the body casing 11 via the through-hole of the anti-vibration member 43 comprised of a coil spring. In this case, the anti-vibration member 43 comprising of a coil spring allows the signal line 37 to be prevented from being exposed to outside, so that breaking of the signal line 37 is less likely to occur. It should be noted that the anti-vibration member 43 may be comprised of a tubular-shaped, flexible, elastic member formed of an elastic material such as rubber, instead of the coil spring. In the chainsaw 10 according to this embodiment, the signal line 37 connects the manipulation unit 34 and the control unit 27 together with a slack in a region between the body casing 11 and the handle section 30. In this case, the slack of the signal line 37 makes it possible to reliably suppress breaking of the signal line 37, even in a situation where, due to vibration of the body casing 11 during use of the chainsaw 10, the body casing 11 is displaced with respect to the handle section 30. Preferably, the signal line 37 is slacked in the range of 10 to 20% of a path length between the manipulation unit 34 and the control unit 27.

In the chainsaw 10 according to this embodiment, the handle section 30 is composed of a handle unit integrally having the rear handle (first handle) 31 and the front handle (second handle) 33 which are configured to be gripped, respectively, by one of worker's hands and the other hand, wherein the anti-vibration members 41 to 45 are interposed between the body casing 11 and the handle unit. In this case, the rear handle 31 and the front handle 33 can be attached to the body casing 11 in the form of a single unit. This makes it possible to improve assembling efficiency of the chainsaw 10. It should be noted that the rear handle 31 and the front handle 33 may be prepared as separate components and supported by the body casing 11 while the anti-vibration members are interposed therebetween, i.e., in an elastic (anti-vibration) manner, although the assembling efficiency deteriorates.

Although the chainsaw according to the above embodiment is a so-called "rear-handle chainsaw" comprising a rear handle and a front handle (also called "side handle"), the present invention is not limited to the rear-handle chainsaw, but may be applied to a so-called "top-handle chainsaw" comprising a top handle provided at a top of a body casing, and a front handle (also called "side handle").

In the above embodiment, each of the anti-vibration members 41 to 43 is comprised of a coil spring, and each of the anti-vibration members 44, 45 is comprised of an elastic rubber member. Alternatively, one of a coil spring and an elastic member such as rubber member may be appropriately employed as each of the anti-vibration members 41 to 45.

What is claimed is:
1. A chainsaw comprising:
a body casing;
an electric motor provided inside the body casing;
a guide bar provided in a front portion of the body casing, the guide bar protruding forwardly from the body casing;

a saw chain provided around an outer periphery of the guide bar in an endlessly movable manner, the electric motor driving the saw chain along the outer periphery of the guide bar;

a handle section configured to be gripped by a worker to support the chainsaw, the handle section comprising a handle unit integrally having a first handle and a second handle, the first handle configured to be gripped by one of a worker's hands and the second handle configured to be gripped by another of the worker's hands;

a battery pack that is detachably provided on the body casing and that supplies power to the electric motor; and a plurality of anti-vibration members are disposed so as to surround a position of a center of gravity of the chainsaw between the body casing and the handle section when the chainsaw is viewed from a lateral direction, wherein:

the handle section is provided with a manipulation unit operable to output an operating signal for operating the electric motor; and the body casing is provided with a control unit connected to a signal line for transmitting therethrough the operating signal output from the manipulation unit, the control unit being operable to control the driving of the electric motor based on the operating signal, and wherein the signal line connects the manipulation unit and the control unit together with slack provided in the signal line in a region between the body casing and the handle section.

2. The chainsaw as recited in claim 1, wherein at least one of the plurality of anti-vibration members is comprised of a coil spring or a tubular-shaped, flexible, elastic member, defining therein a through-hole extending in an axial direction thereof, and wherein the signal line is led out from the handle section into the body casing via the through-hole of the at least one of the plurality of anti-vibration members.

3. The chainsaw as recited in claim 2, wherein the at least one of the plurality of anti-vibration members is interposed between the body casing and the handle unit.

4. The chainsaw as recited in claim 1, wherein at least one of the plurality of anti-vibration members is interposed between the body casing and the handle unit.

* * * * *